United States Patent
Sonnenschein et al.

[19]

[11] Patent Number: 6,130,859
[45] Date of Patent: Oct. 10, 2000

[54] METHOD AND APPARATUS FOR CARRYING OUT HIGH DATA RATE AND VOICE UNDERWATER COMMUNICATION

[75] Inventors: Menashe Sonnenschein, Beer-Sheva; Dov Wulich, Metar; Elazar Sonnenschein, Beer-Sheva, all of Israel

[73] Assignee: Divecom Ltd., Omer, Israel

[21] Appl. No.: 09/199,832

[22] Filed: Nov. 25, 1998

[30] Foreign Application Priority Data

| Dec. 1, 1997 | [IL] | Israel | 122375 |
| Jun. 18, 1998 | [WO] | WIPO | PCT/IL98/00288 |
| Nov. 19, 1998 | [IL] | Israel | 127156 |

[51] Int. Cl.$^7$ .................................................. H04B 11/00
[52] U.S. Cl. ........................... 367/134; 340/850; 367/904
[58] Field of Search .................................. 367/134, 901, 367/902, 904; 340/850

[56] References Cited

U.S. PATENT DOCUMENTS

| 4,463,452 | 7/1984 | Chase, Jr. . | |
| 5,018,114 | 5/1991 | Mackelburg et al. . | |
| 5,124,955 | 6/1992 | Jackson et al. . | |
| 5,301,167 | 4/1994 | Proakis et al. . | |
| 5,392,771 | 2/1995 | Mock et al. . | |
| 5,432,754 | 7/1995 | Brady et al. . | |
| 5,530,682 | 6/1996 | Brosow | 367/134 |
| 5,548,582 | 8/1996 | Brajal et al. | 370/18 |
| 5,784,339 | 7/1998 | Woodsum et al. . | |

FOREIGN PATENT DOCUMENTS

| 2141619 | 8/1996 | Canada . |
| 5 219006 | 8/1993 | Japan . |
| 9 046314 | 2/1997 | Japan . |

OTHER PUBLICATIONS

Baggeroer et al., "DATS—A Digital Acoustic Telemetry System for Underwater Communications" Oceans '81, Conference Record, The Ocean, Boston Mass, pp. 55–60, Sep. 1981.

S. Coatelan et al., "Design and Test of a Multicarrier Transmission System on the Shallow Water Acoustic Channel", IEEE, 1994, pp. III–472–476.

D. Thompson, et al., "Performance of Coherent PSK Receivers using Adaptive Combining, Beamforming and Equalisation in 50k, Underwater Acoustic Channels", IEEE, Aug. 1996, pp. 845–50.

(List continued on next page.)

*Primary Examiner*—Ian J. Lobo
*Attorney, Agent, or Firm*—Stroock & Stroock & Lavan LLP

[57] ABSTRACT

An underwater apparatus for transmitting and receiving high rate data and voice communication including a transmitter, a receiver, and a Doppler frequency shift compensator. The transmitter includes a data source comprising digital data to be transmitted by the apparatus through the water, a serial-to-parallel data processor for splitting the serial digital data into n parallel data channels, a n-channel modulator for receiving the n parallel data channels and for modulating those channels with n pairs of ultrasonic carriers to produce a modulated signal. The transmitter also includes a hydrophone for receiving and transmitting the modulated signal. The receiver includes a hydrophone for receiving a modulated signal. The receiver also includes RF circuitry for amplifying and shaping the received modulated signal, a serial-to-parallel data processor for splitting the amplified and shaped data into n parallel channels, a n-channel demodulator for demodulating the shaped signal and for outputting n channels of digital data, and a parallel-to-serial data processor for receiving n parallel channels of data from the demodulator and for combining those channels into serial data. The Doppler compensator measures the frequency of at least one of two unmodulated signals transmitted as part of the modulated signal and compares the measured frequency with a predetermined frequency. Operation of the demodulator is adjusted to compensate for any deviation between the measured and predetermined frequency.

31 Claims, 9 Drawing Sheets

OTHER PUBLICATIONS

Elie Bejjani et al., "Multicarrier Coherent Communications for the Underwater Acoustic Channel", IEEE, Aug. 1996, pp. 1125–30.

W.K. Lam et al., "A Frequency Domain Adaptive Coded Decision Feedback Equalizer for a Broadband UWA COFDM System", IEEE, Jun. 1998, pp. 794–99.

J.J. Davies et al., "UW Communication System Design for Severely Dispersed Channels", IEEE, Jun. 1998, pp. 1022–27.

Dominique Albonico et al., "Test of an High Data Rate Acoustic Link in Shallow Water", IEEE, Jun. 1998, pp. 1028–32.

Craig P. Sayers, et al., "Teleprogramming for Subsea Teleoperation Using Acoustic Communication", IEEE Journal of Oceanic Engineering, vol. 23, No. 1, Jan. 1998, pp. 60–71.

Bryan Woodward et al., "Digital Underwater Acoustic Voice Communications", IEEE Journal of Oceanic Engineering, vol. 21, No. 2, Apr. 1996, pp. 181–92.

Rodney F.W. Coates, et al., "Bass 300 Paracom", IEEE Journal of Oceanic Engineering, vol. 21, No. 2, Apr. 1996, pp. 225–232.

Adam Zielinski et al., "Performance Analysis of Digital Acoustic Communication in a Shallow Water Channel", IEEE Journal of Oceanic Engineering, vol. 20, No. 4, Oct. 1995, pp. 293–99.

Anthony G. Bessios, et al., "Fast Underwater Acoustic Data Link Design Via Multicarrier Modulation and Higher–Order Statistics Equalization", pp. 594–99.

J.C. Jones, et al., The Design and Testing of a DSP, Half–Duplex, Vertical, DPSK Communication Link, IEEE, Feb. 1997, pp. 259–266.

W.K. Lam, et al., "A Broadband UWA Communication System Based on CODM Modulation", IEEE, Feb. 1997, pp. 862–69.

Lee Freitag et al., "A Bidirectional Coherent Acoustic Communication System for Underwater Vehicles", IEEE, Jun. 1998, pp. 482–86.

Maurice Green, et al., "Underwater Acoustic Modem Configured for use in a Local Area Network", IEEE, Jun. 1998, pp. 634–638.

Doris Carvalho, et al., "The Results of Several Acoustic Telemetry Tests in both Shallow and Deep Water", pp. 604–614.

Milica Stojanovic, et al., "Phase–Coherent Digital Communications for Underwater Acoustic Channels", IEEE Journal of Oceanic Engineering, vol. 19, No. 1, Jan. 1994, pp. 100–111.

Coatelan et al.,: "Design and test . . . acoustic channel," Oceans 95 MTS/IEEE, vol. 3, Oct. 9–12, 1995, pp. 2065–2070, XP002080999, San Diego, CA, US.

Lam et al.: "A coherent COFDM . . . acoustic channel," $7^{th}$ International Conf. On EE in Oceanography, Jun. 23–25, 1997, pp. 198–203, OP 002081000, Southampton, UK.

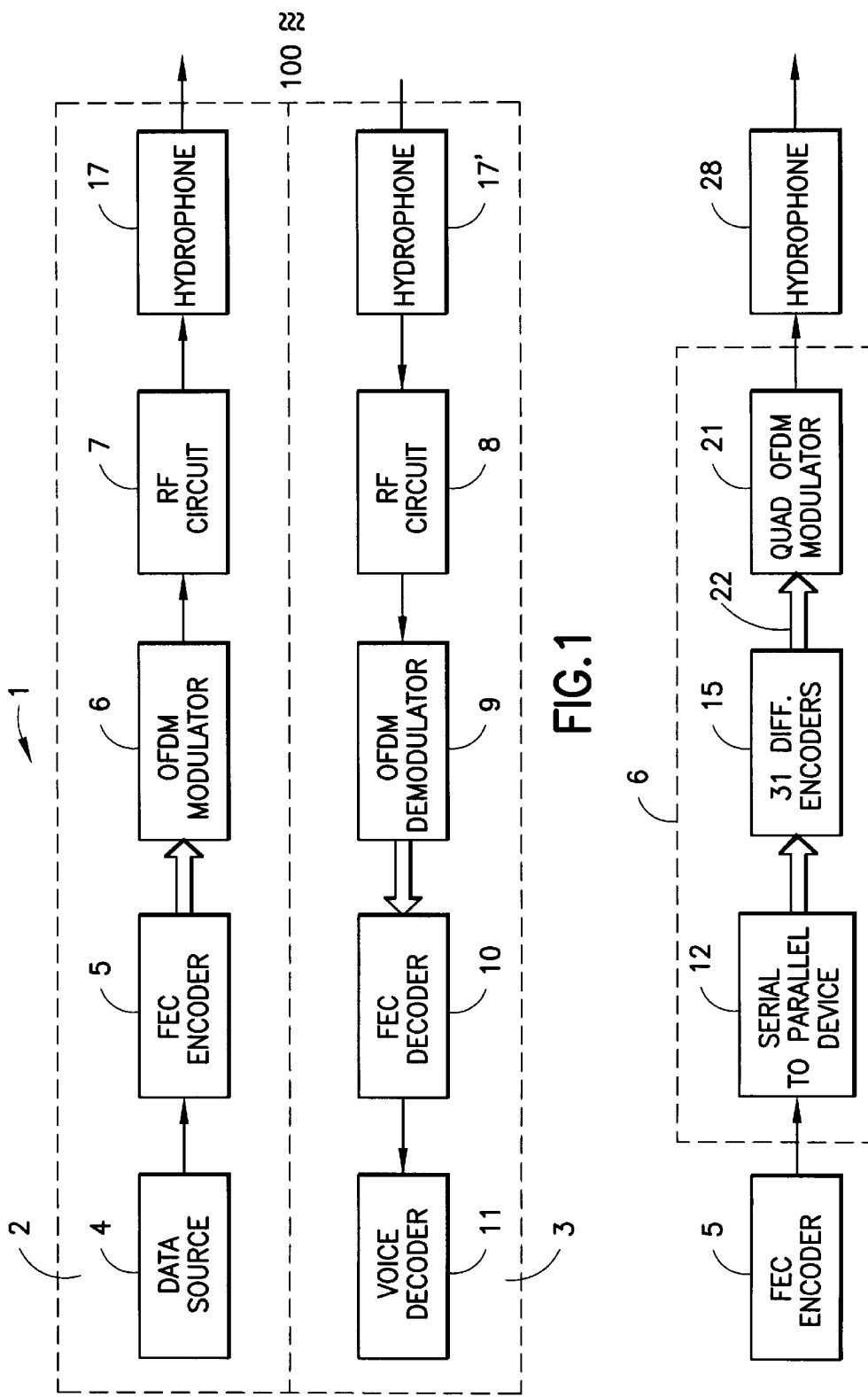

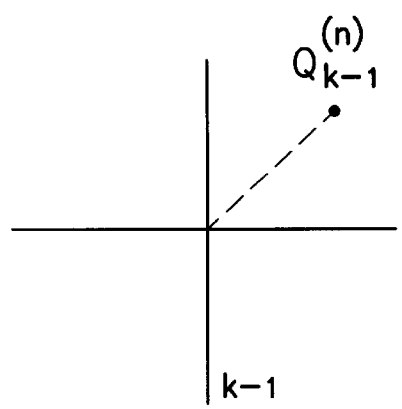
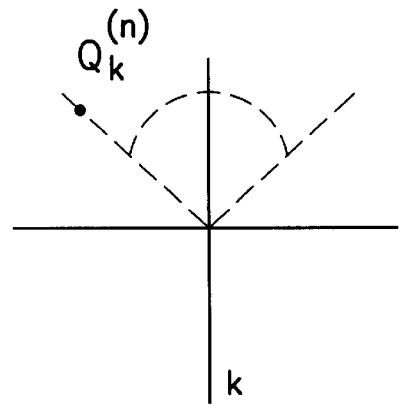
FIG.8A  FIG.8B
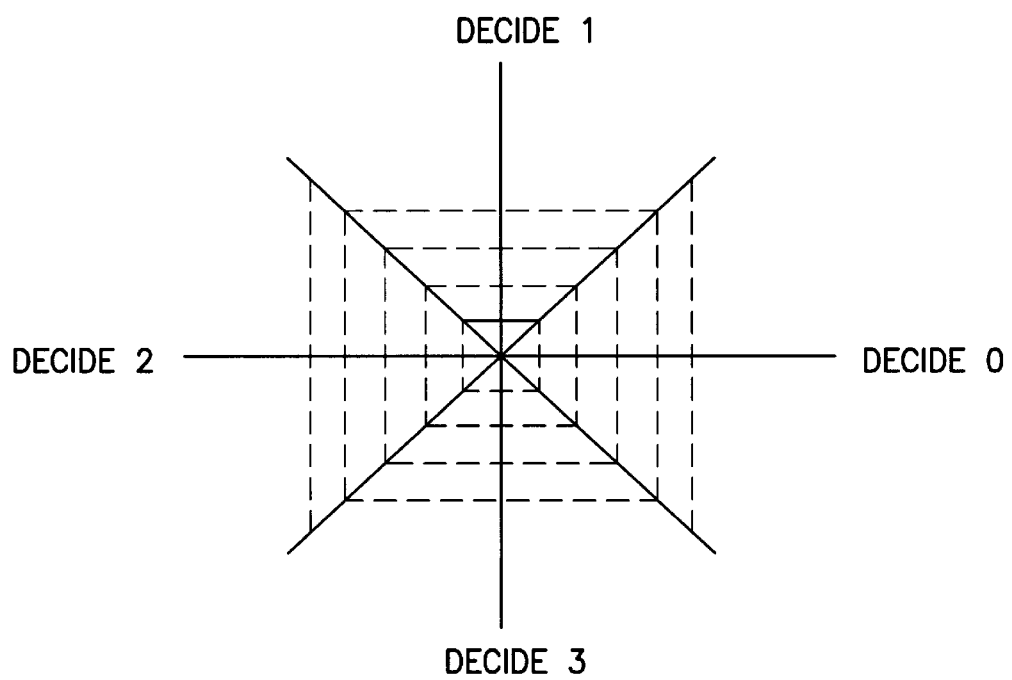
FIG.9

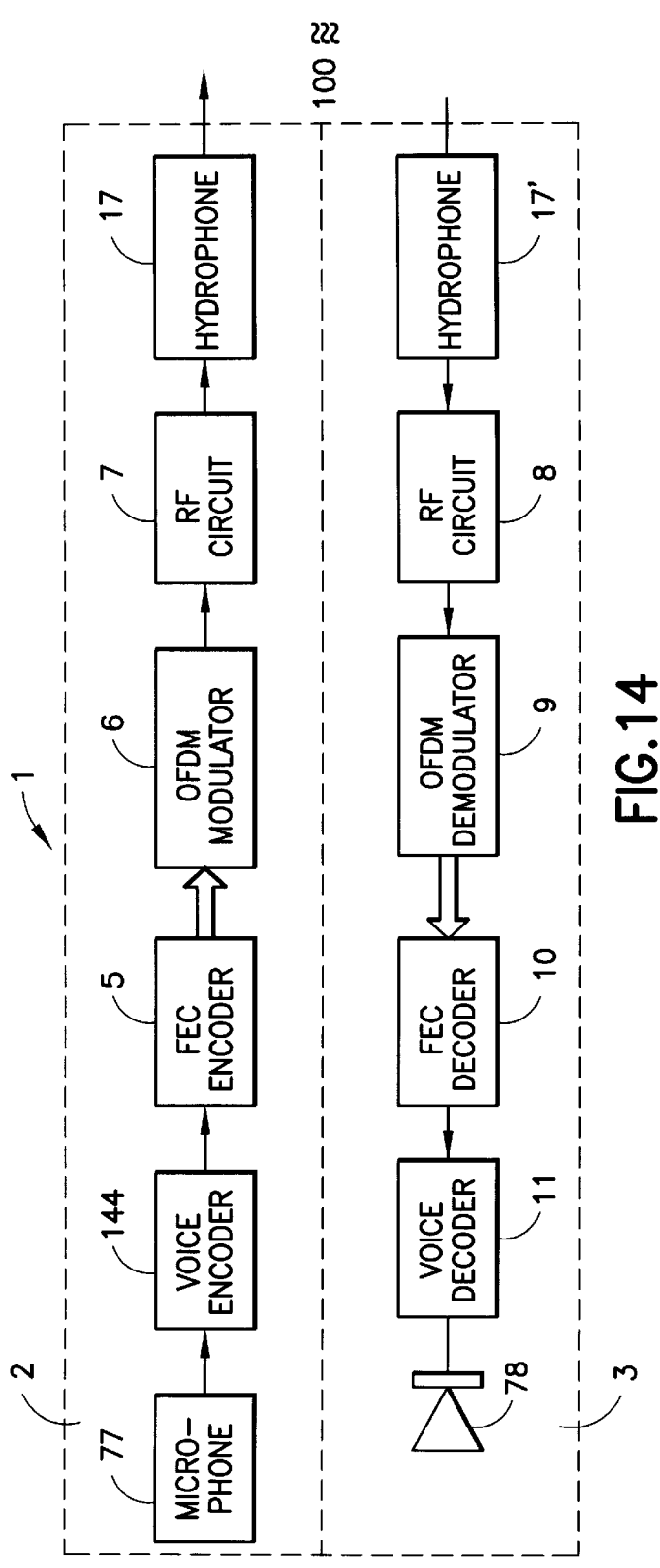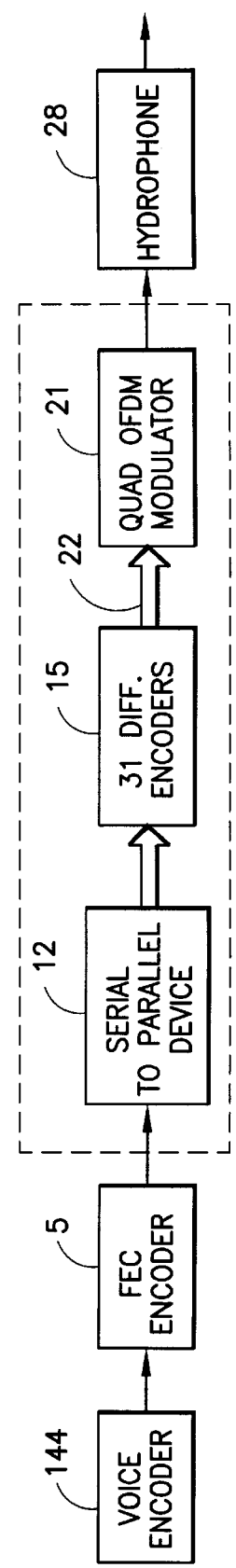

METHOD AND APPARATUS FOR CARRYING OUT HIGH DATA RATE AND VOICE UNDERWATER COMMUNICATION

FIELD OF THE INVENTION

The present invention relates to means for underwater communication. More particularly, the invention relates to a method for carrying out high rate underwater communication, and to an apparatus for carrying out high rate underwater communication according to said method.

BACKGROUND OF THE INVENTION

Performing a reliable underwater communication is a relatively complicated task. It is known that electromagnetic waves are significantly attenuated when propagating through water. The only frequency band that is used for electromagnetic underwater communication is the VLF (Very Low Frequency) band, in the range of up to 10 kHz. In this range, high power transmission is needed, and use of extremely long antennas is required at both the receiving and transmitting ends. Therefore, such use is generally limited to submarine communications, and cannot be exploited for personal use. For shorter range underwater communication, conventional systems use ultrasound acoustic transmission, generally in the frequency range of 20 kHz–600 kHz. Unfortunately, however, in the acoustic frequency range, the water as a communication medium provides practically only a relatively narrow bandwidth, which limits the speed of the data transfer through water. The ability to reliably transfer data through water with acoustic waves is further complicated by the different layers of water density, resulting from non-constant speed of sound in water, multipath propagation of the signal, fading, and other environmental disturbances. Furthermore, it is known that the propagation speed of ultrasonic waves in water is significantly lower than the propagation speed of electromagnetic waves in air. Therefore, when it is desired to communicate in water between two apparatuses, of which at least one is not stationary, or moves at a low speed, the Doppler effect adversely affects the signal and the ability to reliably interpret the transmitted data at the receiving apparatus.

It has been found that many conventional types of electromagnetic air communication techniques are unable to overcome the abovementioned problems, which are typical of underwater communications.

Wireless apparatus for carrying out communication in water is known in the art. Such apparatus is used for example in telemetry systems for transferring data that was accumulated during oceanographic researches, or in communication devices for divers. Copending Israeli Patent Application No. 121561, filed on Aug. 18, 1997, by the same applicant herein, discloses an underwater communication apparatus and a communication network for divers. Communication devices for divers are also shown in CA 2,141,619, WO 97/26551, and in U.S. Pat. No. 4,463,452. Other existing apparatus, which is capable of transferring data at a relatively low rate, generally operates in the range of no more than about 600 bits per second, a rate which is in general sufficient for telemetry purposes, but not for other purposes which require a significantly higher rate of data transfer, such as real time voice or picture transmission. For satisfying these requirements, it is desired to provide an underwater modem which is capable of transferring data at a much higher transfer rate, at least in the range of about 4800 bits per second to 9600 bits per second.

Moreover, existing apparatus enables underwater communication between two locations being at a relatively close range, generally in the range of less than 150 meters, and require a direct "line of sight" between the transmitting and receiving devices. Such apparatus does not provide means for carrying out reliable underwater communication between two sites that may be located several kilometers away from one another, and between which there is no "line of sight".

It is an object of the invention to provide a modem which can reliably transfer and receive data at a high rate through water. The term "underwater modem" or simply "modem", when used herein, refers to an apparatus which is capable of transmitting and receiving high-rate data through water, unless otherwise specifically stated. By "high-rate" data transmission it is meant to indicate a band rate of at least 1200 bps, and preferably of at least 4800 bps.

It is still another purpose of the invention to provide an underwater modem which can efficiently overcome fading, multipath, Doppler and environmental disturbances.

It is still another purpose of the invention to provide an underwater modem which can eliminate Doppler distortions of the transmitted signal which are due to movement of the transmitting modem, the receiving modem, or both.

It is still another object of the invention to provide an underwater modem comprising means for correcting errors.

It is another object of the invention to provide means for using the said underwater modem in underwater sound communication.

Other purposes and advantages of the invention will become apparent as the description proceeds.

SUMMARY OF THE INVENTION

It has been found by the inventors that the fading and multipath problems which significantly affect underwater acoustic communications, resemble the fading and multipath problems which affect HF (High Frequency, short wave) radio communication. One method, originally developed for overcoming the fading and multipath problems in HF communication is the Orthogonal Frequency Division Multiplexing (OFDM). However, the OFDM communication method has not yet been applied to underwater communication.

OFDM has been found by the applicants to be the best modulation method for overcoming fading and multipath problems underwater. However, the use of OFDM in itself is not sufficient for solving all the aforesaid problems of underwater communication, and additional means should be provided in order to overcome the Doppler effect, to ensure communications even when a line of sight between the transmitting and receiving apparatuses does not exist, and to assure a reliable (error free) communication. The Doppler effect is much more severe in underwater acoustic communications than in electromagnetic air communications, as acoustic waves propagate in water at a speed of about 1500 m/sec, while electromagnetic waves propagate at the speed of light, i.e., 300,000 km/sec in air. Furthermore, the propagation speed in water is not constant and depends on the depth, the water temperature, and other factors. The modem according to one embodiment of the invention provides means for overcoming the fading and multipath problems, as well as the signal distortions due to the Doppler effects. As will be shown hereinafter, the modem according to the invention can reliably transfer data at a rate much higher than the transfer rate of any prior art underwater communication apparatus.

According to a preferred embodiment of the invention, the underwater modulator-demodulator (modem) apparatus for transmitting and receiving data at a high rate through water, comprises:

a. A transmitting section comprising:
   data source means, comprising digital data to be transmitted through water;
   serial-to-parallel data processing means, for splitting a serial data into n parallel channels;
   n-channel modulator means, for receiving data from said n parallel channels and for modulating the same with n pairs of ultrasonic carriers, thereby producing a modulated signal; and
   hydrophone means, for receiving said modulated signal from said n channel modulator, and for transmitting same through water; and b. A receiving section comprising:
   hydrophone means, for receiving a modulated signal from the water, and for conveying the same to an RF circuit;
   RF circuitry, for amplifying and shaping the received modulated signal, and for conveying the same to serial-to-parallel means;
   serial-to-parallel means, for receiving shaped data from the RF circuit, and for splitting the same into n parallel channels;
   n-channel demodulator means, for demodulating said shaped signal conveyed to the demodulator from said RF circuit, and for outputting n channels of digital data; and
   parallel-to-serial means for receiving n parallel channels of outputted data from the demodulator, and for combining the data into serial data.

Preferably, the n-channel modulator means in the transmitting section is an n-channel OFDM modulator means, for receiving data from the n parallel channels and for modulating the same with n pairs of orthogonal ultrasonic carriers, thereby producing a modulated signal, and the n-channel demodulator means at the receiving section is an n-channel OFDM demodulator means, comprising n pairs of orthogonal ultrasonic sines for demodulating the shaped signal conveyed to the n-channel OFDM demodulator from the RF circuit, and for outputting n channels of digital data.

Preferably, the receiving section and the transmitting section are contained within the same case, and the transmitting hydrophone and the receiving hydrophone are incorporated within the same hydrophone, and more preferably, the hydrophone is a multidirectional hydrophone. However, in some applications the receiving section and the transmitting section may be contained within separate cases.

According to one embodiment of the invention, the transmitting section further comprises an n-channel differential encoder for receiving data from the serial-to-parallel means, for differentially encoding the data on each one of said n channels, and for providing the differentially encoded data to the n-channel OFDM modulator, and the receiving section further comprises an n-channel differential decoder for receiving n channels of demodulated data from the demodulator, and for differentially decoding said demodulated data.

Preferably, the transmitting section further comprises a Forward Error Correcting (FEC) device for encoding the digital data to be transmitted, and the receiving section further comprises a Forward Error Correcting (FEC) device for decoding the received encoded data by the use of at least one error correcting code, and for outputting the same to the parallel-to-serial device of the receiving section.

Still preferably, the apparatus further comprises means for compensating for Doppler effects on the transmitted signal propagating through water. Said means for compensating for Doppler effects according to one embodiment of the invention comprise, in the modulator of the transmitting section, additional means for transmitting at least one unmodulated carrier, and in the receiving section, a frequency adjusting device for measuring the frequency of said at least one unmodulated carrier, and for compensating for any deviation in it. When the modem uses OFDM modulation, the frequency adjusting device compensates for Doppler effects by changing the frequency of each one of the n pairs of orthogonal sines of the OFDM demodulator by the same measured deviation.

Preferably, at least the n-channel OFDM modulator at the transmitting section and the demodulator at the receiving section comprises a DSP, incorporated within an integrated circuit.

The invention further relates to a method for carrying out a high-rate underwater communication, comprising performing the following steps:

(i) transmitting data by:
   a. Providing a serial data in digital form to be transmitted;
   b. Providing means for splitting the serial data into n parallel channels and assigning symbols to groups of data bits;
   c. Modulating said symbols by an n-channels OFDM modulation;
   d. Transmitting said OFDM modulated data through a hydrophone, into the water; and (ii) Receiving said transmitted data in understandable form, by:
   a. Receiving said transmitted OFDM modulated data by a hydrophone;
   b. Demodulating the received signal by an n-channel OFDM demodulator;
   c. Decoding the demodulated data in said n channels; and
   d. Converting the data from said n channels from parallel into serial form.

The said method performs better when multidirectional hydrophones are used at the transmitting and at the receiving ends. Optionally, each end may be capable of performing bi-directional communication, and if so, one hydrophone may be used for both receiving and transmitting.

Preferably, the said method is further enhanced by further having the following steps:

a. transmitting at least one additional unmodulated ultrasonic carrier (pilot) simultaneously with the OFDM modulated data; and
b. when receiving said OFDM modulated data and said at least one additional unmodulated ultrasonic carrier by the hydrophone, measuring the frequency shift of said unmodulated signal from its expected frequency value, and compensating for said shift by adjusting the OFDM demodulator of the receiving section accordingly.

The underwater modem according to the invention can also be used for communicating sound through water. In such case, in the transmitting section of the modem, the data source means comprises a microphone for receiving a sound and converting it to an analog electric signal, and a voice encoder for receiving said analog electric signal and converting it to digital data. The receiving section further comprises a voice decoder for receiving the serial data from the parallel to serial means and converting the said serial data to an analog electric signal, and loudspeaker means for receiving the analog electric signal and converting it to sound. The voice encoder at the transmitting section can be a vocoder operating in a voice encoding mode, and the voice decoder at the receiving section can be a vocoder operating in a voice decoding mode. The sound can be, for example, a voice of a diver to be communicated through water.

Still preferably, the duration of each symbol includes a guard time and said guard time is used for symbol synchronization at the receiving end.

BRIEF DESCRIPTION OF THE DRAWINGS

FIG. 1 illustrates in block diagram form the structure of a modem according to a preferred embodiment of the invention;

FIG. 2 illustrates in block diagram form the structure of the transmitting section of a modem according to a preferred embodiment of the invention;

FIGS. 8a, 8b, and FIG. 9 illustrate the symbol decision algorithm at the receiving section of a modem according to a preferred embodiment of the invention;

FIG. 14 illustrates in block diagram form the structure of a sound modem according to a preferred embodiment of the invention; and FIG. 15 illustrates in block diagram form the structure of the transmitting section of a sound modem according to a preferred embodiment of the invention.

DETAILED DESCRIPTION OF PREFERRED EMBODIMENTS

Figure 3:
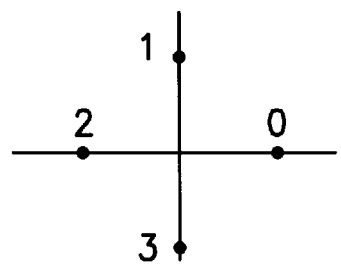
FIG. 3 shows the symbol constellation map of a modem according to a preferred embodiment of the invention.

FIG. 1 schematically shows in block diagram form an underwater modem according to a preferred embodiment of the invention. Conveniently, the modem 1 comprises both a transmitting section 2 and a receiving section 3. While the existence of said two sections in each modem is necessary in order to carry out a reliable bi-directional communication, there may be cases in which communication be carried out according to the invention between two apparatuses, a first one comprising only a transmitting section 2, and a second comprising only a receiving section 3. Hereinafter, if not specifically stated otherwise, it will be assumed for the purpose of this description that each modem comprises both transmitting and receiving sections.

The data source 4 of the transmitting section 2 represents data of any kind, in digital form, that must be transmitted by the wireless modem through water to a receiving modem located underwater in another location. The data from the data source (hereinafter also referred to as "the original data") is provided into an FEC (Forward Error Correction) encoder 5, which combines with it additional bits for error correction, in order to provide to the receiving modem the capability of correcting errors which occur due to disturbances in the underwater medium, and for recovering the original data as generated by the data source. The FEC encoder 5 is conventional in its structure, applying any type of error correction method known in the art. From the FEC encoder, data combining the original data and additional bits (hereinafter generally referred to as "the encoded data") is conveyed to an OFDM modulator 6, which modulates the digital data by a plurality of low frequency carriers. A modulated signal is then conveyed to an RF circuit 7, which, if necessary, transfers the frequency spectrum of the modulated signal into the ultrasonic range, then amplifies it, and transmits it by means of a hydrophone 17 through the underwater medium 100.

The receiving section 3 receives modulated ultrasonic data from the underwater medium 100 by means of hydrophone 17', which is then provided to an input RF circuit 8, which amplifies it, and transfers it downward into a low frequency range. From the output of the input RF circuit 8, the signal is conveyed to an OFDM demodulator 9, which demodulates the signal, and outputs encoded data. The encoded data from the OFDM demodulator is conveyed into an FEC (Forward Error Correction) decoder 10. The FEC decoder 10 performs a process which is the reverse of the process of the FEC encoder 5 in the transmitting modem. The FEC decoder 10 recovers the original data to be forwarded, as conveyed by the data source 4 to the FEC encoder 5 of the transmitting modem. The FEC decoder 10 contains means for analyzing the encoded data, and if it finds that the data has been corrupted, for example, when passing through the underwater medium, it uses the additional bits added by the FEC encoder 5 to correct errors and recover the original data The FEC decoder 10, similar to the FEC encoder 5, is also conventional in its structure, and is capable of recovering errors only to a certain extent.

When discussing binary systems, it is common to refer to bits, as two signal levels are possible, e.g., ±A. In OFDM, which applies the M-ary technique, there exist more than two signal possibilities, and it is common to refer to each possible transmitted signal as a "symbol".

The symbol duration is defined as the sum of the essential duration T plus the guard time ΔT. First, the essential duration T of the symbol and the bandwidth B of one modulated carrier of the transmitted signal has to be chosen in order to accomplish frequency nonselective (flat) and slow fading. The two requirements for achieving a flat and slow fading are:

$$B \ll 1/T_d; \text{ and} \tag{1}$$

$$T \ll 1/\Delta f \tag{2}$$

wherein B is the bandwidth of the transmitted signal, $T_d$ denotes the delay time of the channel, T is the duration of each transmitted symbol, and $\Delta f$ denotes the Doppler spread.

Assuming that T=1/B, the following conditions should be met:

$$T_d \ll T \ll 1/\Delta f \tag{3}$$

If it can be assumed that $T_{d_{max}}$=2 msec and $1/\Delta f_{max}$=100 msec, the selected symbol duration T should be in the range of:

$$2 \text{ msec} << T << 100 \text{ msec} \qquad (4)$$

If a symbol duration of T=10÷20 ms, which is within this range, is used and fulfills this requirement of equation, then this means that the bandwidth of one modulated carrier is B=50 Hz÷100 Hz. It has been found that by using OFDM, it is possible to fulfill requirement (4) and efficiently use a wide spectrum bandwidth (3 kHz, for example). In such a case, the number of carriers N should approximately be:

$$N = BW \cdot T$$

wherein BW denotes the total bandwidth available to the whole OFDM signal.

The applicants, have found that for BW=3 kHz, number of carriers=31, and SNR=10 dB, and for a desired BER= $10^{-3}$, a maximal bit rate of 3000 bps can be achieved in accordance with DQPSK modulation, and with, for example (31,16,7) forward error correcting BCH code. According to a preferred embodiment of the invention, which is given herein as an example, 31 carriers are used, although, of course, different numbers of carriers may be applied. Moreover, it was found that if the number of carriers increases, the maximal bit rate also increases. For example, a bit rate of 9600 bps may be obtained for about 100 carriers.

As said, the Doppler effect is a very serious problem in underwater acoustic communications. A frequency shift of as much as 20 Hz is quite normal in underwater communication. In order to overcome such a severe shift, and in order to keep the receiving section of the modem tuned to the frequency of the received signal, two additional unmodulated carriers, referred to hereinafter as "pilots", are transmitted along with the information bearing signal, that, as said, comprises said 31 modulated carriers. The frequency of the first pilot is selected to be slightly below the lowest frequency modulated carrier, and the second pilot above the highest frequency modulated carrier.

A more detailed block diagram of the OFDM modulator 6 of the transmitting section 2 of the modem, according to this particular preferred embodiment of the invention, is shown in FIG. 2. As use of coherent demodulation is very problematic in underwater applications, due to a very random, rapid, and frequent change in the carrier phase, the modem according to the invention obviates the need for carrier recovery by using differential modulation. More particularly, the data of each of the plurality of carriers of the OFDM is modulated by DQPSK modulation (Differential Quadrature Phase Shift Key Modulation).

As shown in FIG. 2, a serial (original) data is inputted into the FEC encoder 5, which combines with it additional bits for enabling error correction at the receiving modem. From the FEC encoder 5, the data in serial form is conveyed to a serial to parallel device 12, essentially a shift register, which divides each section of 62 bits of serial data (hereinafter, each such 62-bit section will also be referred to as a "word") into 31 two-bit symbols of data to be processed in parallel. It should be noted here that, in order to improve reliability, and to provide better error correction, the allocation of the bits from a word to symbols is not sequential, but is performed by taking one bit form the first half of a 62-bit word, and a second bit from the second half of the same word. A vector of one 62-bits word, its bits allocation to 31 symbols, and the symbols allocation to separate carriers of the OFDM modulator, is shown below:

Vector of input bits assigned to one 62-bit word:

| $b_1$ | $b_2$ | ... | $b_{30}$ | $b_{31}$ | $b_{32}$ | ... | $b_{60}$ | $b_{61}$ | $b_{62}$ |
|---|---|---|---|---|---|---|---|---|---|

Bits allocation to symbols and carriers in the modulator:

| carrier number | 1 | 2 | ... | 30 | 31 |
|---|---|---|---|---|---|
| bits | $b_1$ | $b_2$ | | $b_{30}$ | $b_{31}$ |
| bits | $b_2$ | $b_{33}$ | | $b_{61}$ | $b_{62}$ |
| symbols | $[b_1,b_{32}]$ | $[b_2,b_{33}]$ | | $[b_{30},b_{61}]$ | $[b_{31},b_{62}]$ |

Figure 4:
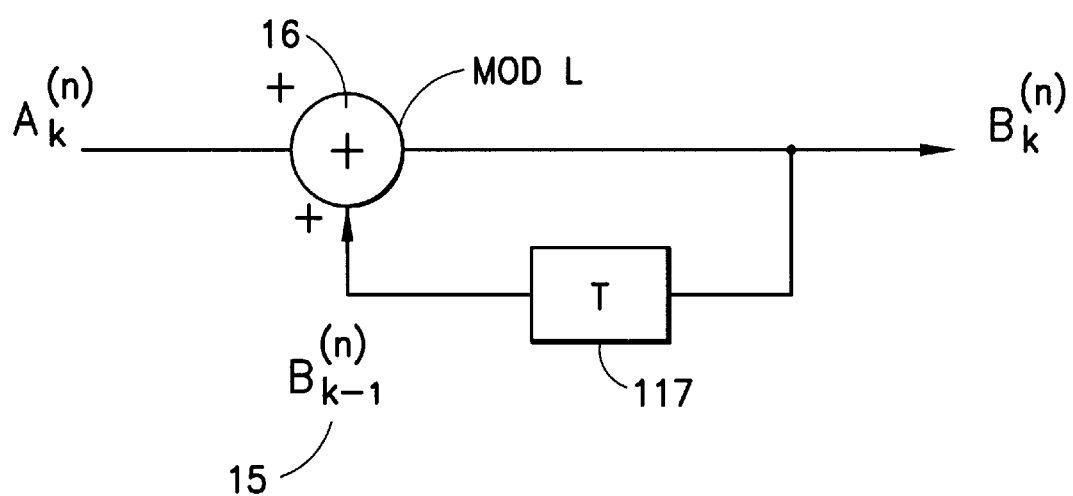
FIG. 4 illustrates in schematic form the structure of the encoder in the transmitting section of the device according to a preferred embodiment of the invention.

Then, all of said 31 symbols of a same data word are conveyed to 31 differential encoders, which perform the following operation:

$$A_k \stackrel{\text{def}}{=} [A_k^{(1)}, A_k^{(2)}, \ldots, A_k^{(N)}], \quad B_k \stackrel{\text{def}}{=} [B_k^{(1)}, B_k^{(2)}, \ldots, B_k^{(N)}]$$

$$B_k^{(n)} = B_{k-1}^{(n)} + A_k^{(n)} \pmod{L}; \quad n = 1, 2, \ldots, N; \quad k = -\infty, \infty.$$

where n denotes the carrier number (n=1, 2, 3, 4 ... N), L=4 are the four possible symbols {0, 1, 2, 3} (assuming each symbol comprises two bits) as defined and shown in the constellation map of FIG. 3. $A_k^{(n)}$ are symbols originated in data source 4, encoded by FEC encoder 5, and separated by the serial to parallel device 12, and k denotes the symbol running index. The structure of each one of the 31 differential encoders is schematically shown in FIG. 4. Block 16 indicates a 1-bit adder, and 117 indicates a delay of T seconds, wherein T is the duration of each symbol.

Figure 5:
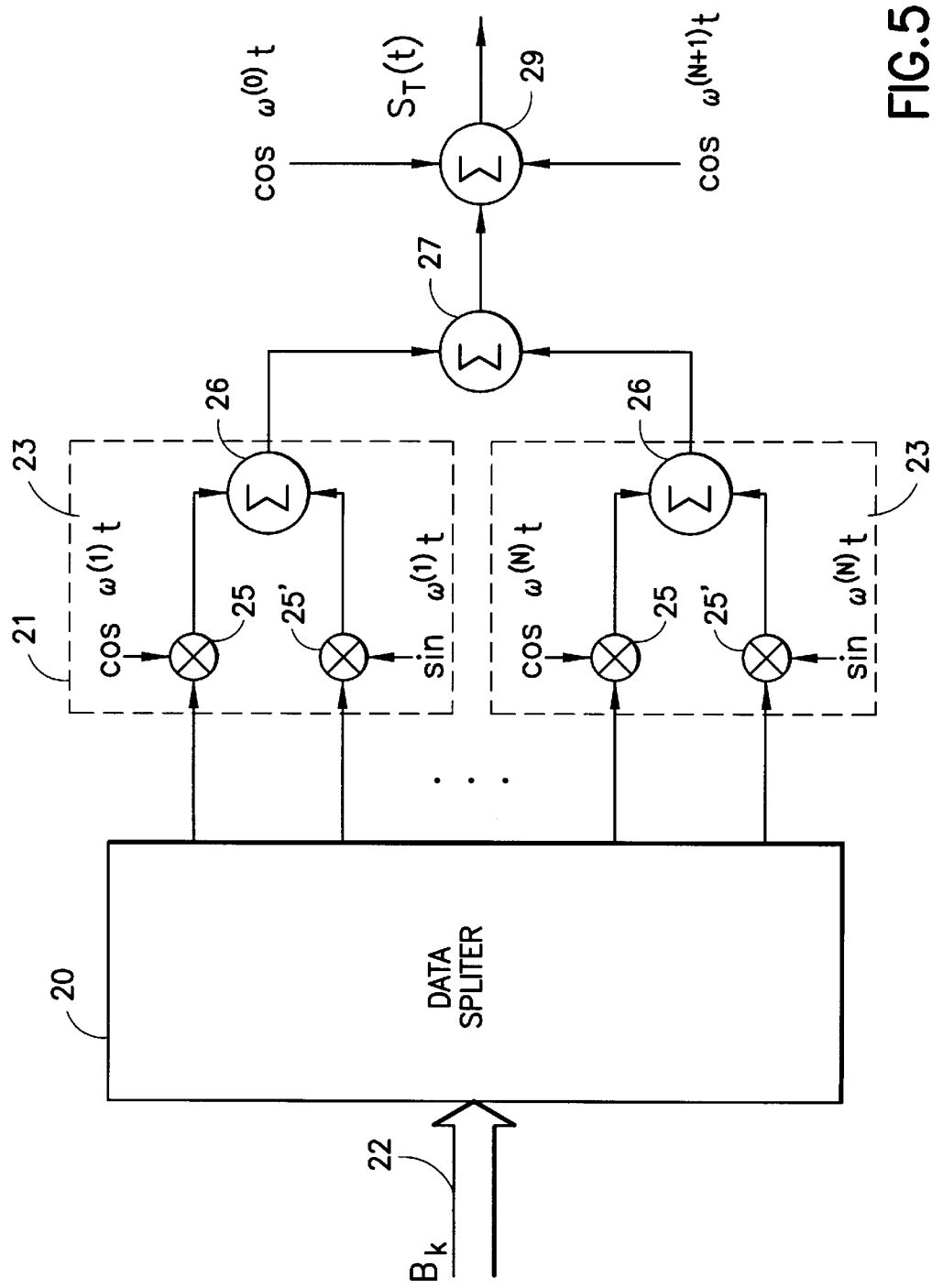
FIG. 5 illustrates in schematic form the structure of the OFDM modulator in the transmitting section of the modem according to a preferred embodiment of the invention.

From the said 31 differential encoders 15, encoded symbols $B_k$ are conveyed in 31 parallel lines 22 to a 31-carrier quadrature OFDM modulator unit 21. The structure of the quadrature OFDM modulator is shown in FIG. 5. Data splitter 20 maneuvers the data from each line 22 to a corresponding orthogonal modulator 23. Each modulator comprises two multipliers 25 and 25', the first multiplier 25 multiplying the data by a cosine sub-carrier, and the second, multiplier 25', multiplying it by an orthogonal, sine sub-carrier. Adder 26 adds the result from said two multipliers. A similar modulating process is performed in each one of the other 30 modulators. The results from all 31 modulators are first combined by summing means 27, then combined by adder 29 with two additional sub-carriers (pilots), $\cos\omega^{(0)}t$ and $\cos\omega^{(N+1)}t$, and finally provided to a hydrophone 28, which transmits the combined signal into the water. If the signal to the hydrophone 28 is not in the required transmitting frequency, a frequency shift to the required transmitting frequency can be made by any conventional means, before conveying the signal to the hydrophone for transmission. The purpose of the transmission of said two sub-carriers $\cos\omega^{(0)}t$ and $\cos\omega^{(N+1)}t$ is to help to overcome the frequency shift due to Doppler effects in water, as will become apparent as the description proceeds. Furthermore, it should be noted that, for synchronization purposes at the receiving modem, a guard interval is used. The duration of the guard interval may vary. However, it should preferably be at least in the order of about 10% of the symbol duration T.

Figure 13:
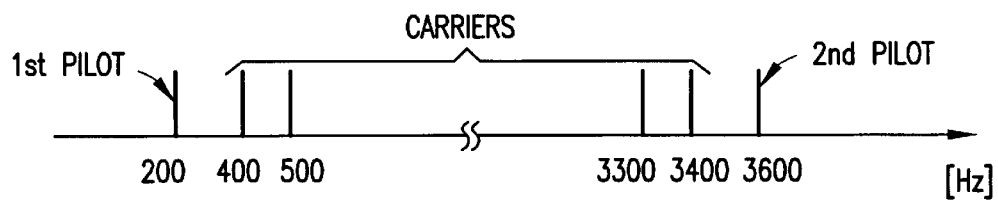
FIG. 13 is an example of a spectrum diagram showing the band spectrum of a modem according to a preferred embodiment of the invention.

An example of a band spectrum of a modem according to one embodiment of the invention is shown in FIG. 13. As shown, the OFDM transmission is carried out by 31 modulated carriers $\cos\omega^{(1)}t$–$\cos\omega^{(31)}t$, and two unmodulated carriers (pilots) $\cos\omega^{(0)}t$ and $\cos\omega^{(32)}t$. The frequencies assignments for each one of said carriers according to this example are as follows:

| | | | |
|---|---|---|---|
| $\cos\omega^{(0)}t = 200$ Hz | $\cos\omega^{(9)}t = 1200$ Hz | $\cos\omega^{(18)}t = 2100$ Hz | $\cos\omega^{(27)}t = 3000$ Hz |
| $\cos\omega^{(1)}t = 400$ Hz | $\cos\omega^{(10)}t = 1300$ Hz | $\cos\omega^{(19)}t = 2200$ Hz | $\cos\omega^{(28)}t = 3100$ Hz |
| $\cos\omega^{(2)}t = 500$ Hz | $\cos\omega^{(11)}t = 1400$ Hz | $\cos\omega^{(20)}t = 2300$ Hz | $\cos\omega^{(29)}t = 3200$ Hz |
| $\cos\omega^{(3)}t = 600$ Hz | $\cos\omega^{(12)}t = 1500$ Hz | $\cos\omega^{(21)}t = 2400$ Hz | $\cos\omega^{(30)}t = 3300$ Hz |
| $\cos\omega^{(4)}t = 700$ Hz | $\cos\omega^{(13)}t = 1600$ Hz | $\cos\omega^{(22)}t = 2500$ Hz | $\cos\omega^{(31)}t = 3400$ Hz |
| $\cos\omega^{(5)}t = 800$ Hz | $\cos\omega^{(14)}t = 1700$ Hz | $\cos\omega^{(23)}t = 2600$ Hz | $\cos\omega^{(32)}t = 3600$ Hz |
| $\cos\omega^{(6)}t = 900$ Hz | $\cos\omega^{(15)}t = 1800$ Hz | $\cos\omega^{(24)}t = 2700$ Hz | |
| $\cos\omega^{(7)}t = 1000$ Hz | $\cos\omega^{(16)}t = 1900$ Hz | $\cos\omega^{(25)}t = 2800$ Hz | |
| $\cos\omega^{(8)}t = 1100$ Hz | $\cos\omega^{(17)}t = 2000$ Hz | $\cos\omega^{(26)}t = 2900$ Hz | |

The hydrophone, according to a preferred embodiment of the invention, is a multidirectional hydrophone which can transmit or receive essentially equally to or from all directions. It should be noted here that the use of a multidirectional hydrophone, preferably in accordance with OFDM transmission, has been found to significantly improve the reliability of the transmission, and has been found to best overcome various disturbances in the water, such as noise, multipath, and fading. Moreover, such use has been shown to allow an effective, reliable transmission, even when no line of sight exists between the transmitting and the receiving modems. This is indeed surprising since the prior art emphasizes the use of directional hydrophones in underwater communication.

Figure 6:
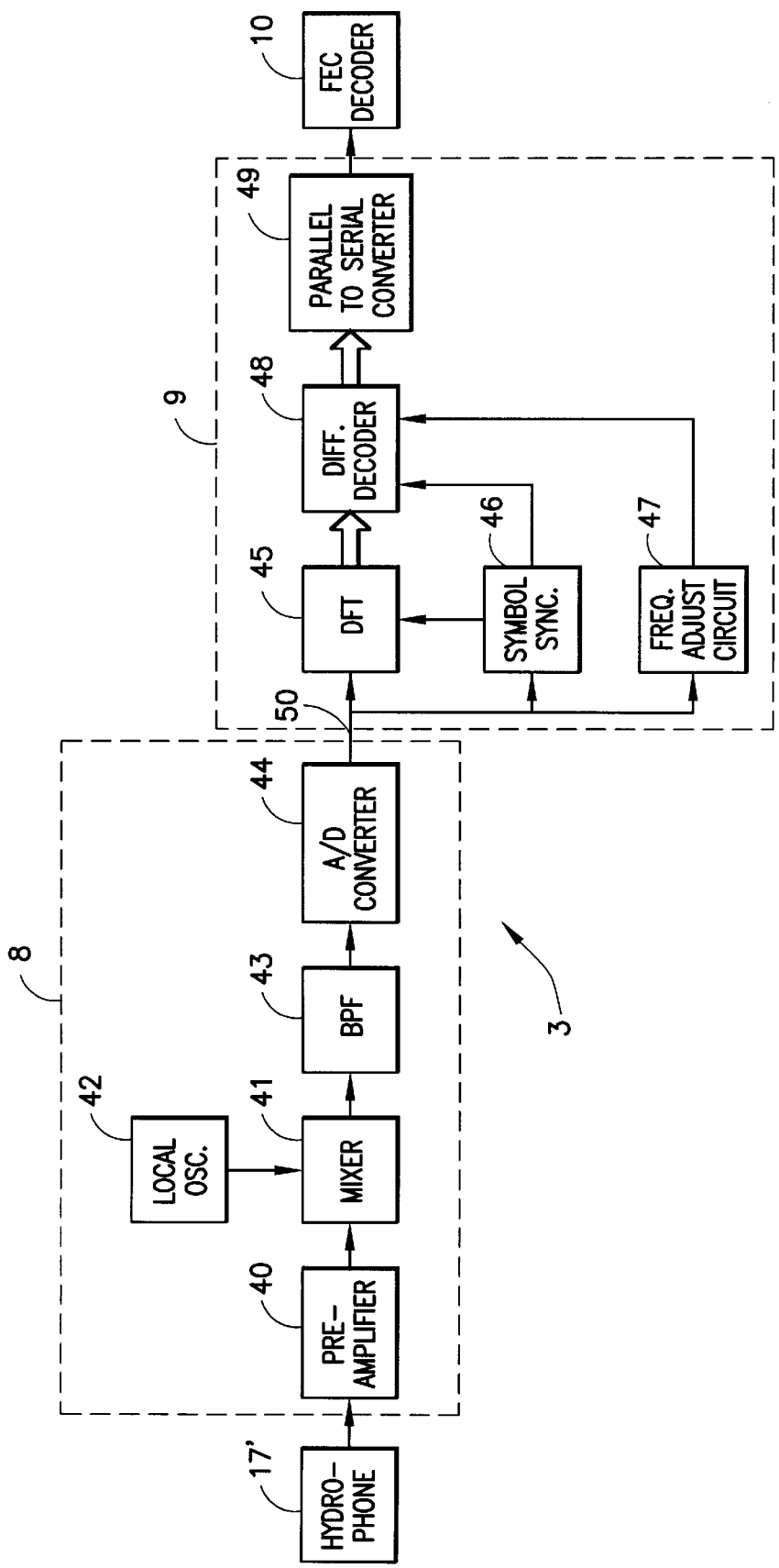
FIG. 6 illustrates in block diagram form the structure of the receiving section of the modem according to a preferred embodiment of the invention.

A more detailed schematic block diagram of the receiving section 3 of the modem is shown in FIG. 6. The RF circuit 8 of the receiving section comprises a preamplifier 40, a local oscillator 42 and mixer 41, a band pass filter 43, and an analog to digital converter 44. Data which is received in the hydrophone is first transferred to a preamplifier 40, which amplifies the signal. From the preamplifier, an amplified signal is passed on to a mixer 41. As mentioned hereinbefore, the signal to the mixer spans a bandwidth of 3.5 kHz according to the example given above, and is positioned, for example, between 40.2 kHz and 43.6 kHz. The mixer 41 also receives a frequency of 40 kHz, for example, from the local oscillator, converting down the bandwidth of the signal to span frequencies of between 200 Hz–3600 Hz. Then the signal from the mixer 41 is conveyed to low pass filter 43 and then to an analog to digital (A/D) converter 44, which samples the signal and converts it into a digital representation.

The signal, as said, in digital representation, is then provided into the OFDM demodulator 9. The OFDM demodulator 9 comprises a DFT (Discrete Fourier Transformer) 45, a symbol synchronizer 46, a frequency adjust circuit 47, a decision device and differential decoder 48, and a parallel to serial device 49. It should be noted here that the OFDM demodulator 9 is preferably implemented, according to the invention, by one DSP (Digital Signal Processing) circuit, generally available in one integrated chip. However, it may be also implemented by other means well known to those skilled in the art, for example, by a powerful microprocessor. The signal form the A/D converter 44, as said, in digital form, is conveyed in parallel to the DFT 45, to the symbol synchronizer 46, and to the frequency adjust circuit 47. The symbol synchronizer provides to both the DFT 45 and to the decision device and differential decoder 48 a clock indicating the beginning and the end of a received symbol. The frequency adjust circuit 47 inspects the two sub-carriers that are combined with the transmitted signal, for detecting frequency shift, generally due to Doppler effects on the signal propagated in water. The frequency adjust circuit 47 continuously updates the decision device and differential decoder 48 of any frequency shift. The decision device and differential decoder 48, after detecting 31 symbols simultaneously, provides 62 bits representing the symbols in parallel to the parallel to serial device 49, which separates the symbols into bits, which are then combined into two words, and outputted to the FEC decoder 10.

Figure 7:
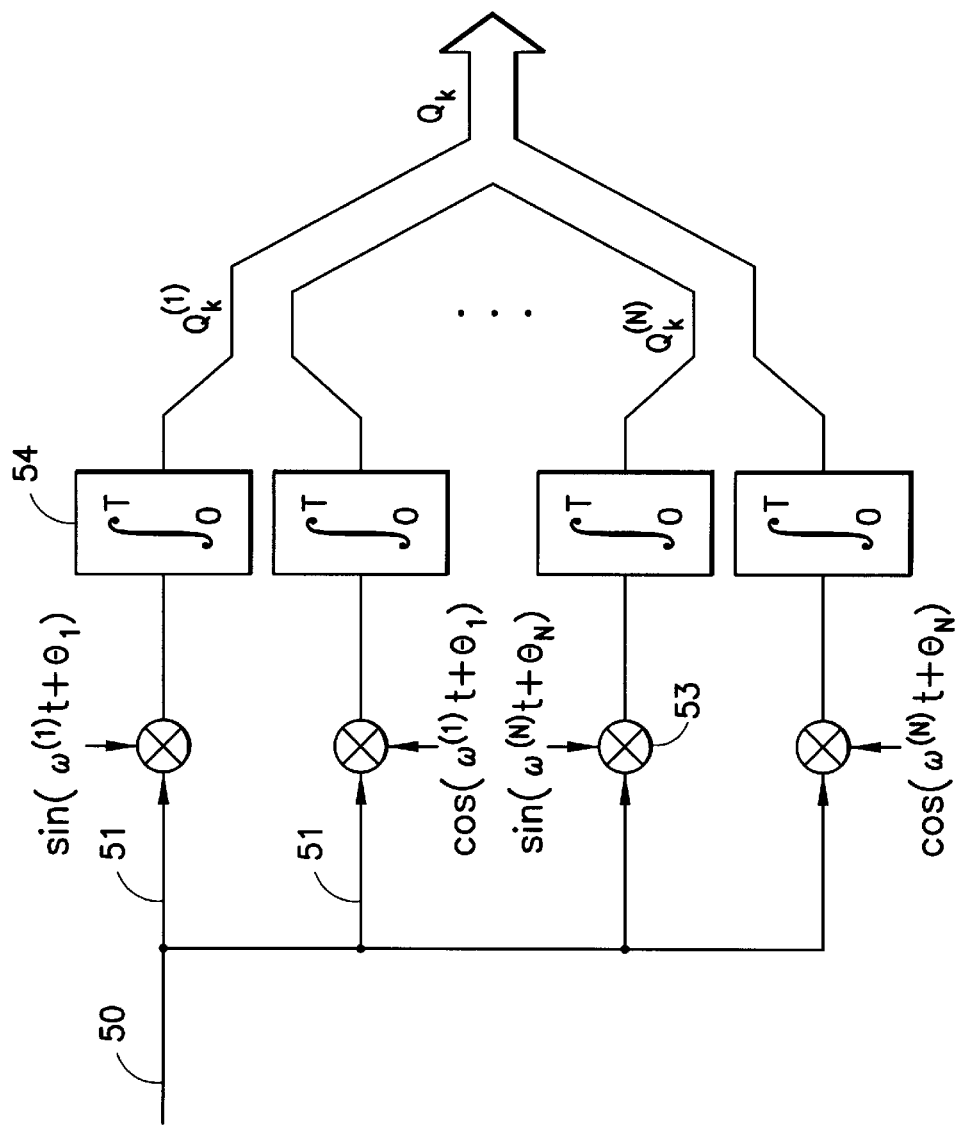
FIG. 7 illustrates in schematic form the structure of the DFT (Discrete Fourier Transformer) block of the transmitting section of a modem according to a preferred embodiment of the invention.

FIG. 7 shows the structure of the DFT 45 in greater detail. The received signal, after being sampled by the A/D 44, and converted into a digital representation, is conveyed to the DFT on line 50, which is then split into sixty-two parallel lines 51, each one of said parallel lines 51 leading to a corresponding one of sixty-two multipliers 53. The said sixty-two multipliers are divided into thirty-one orthogonal pairs, one multiplier in each pair is provided with a $\sin(\omega^{(n)}t+\theta_x)$, and a second one with a $\cos(\omega^{(n)}t+\theta_x)$, wherein n [n=1, 2, 3, . . . 31] indicates the symbol number in a 31-symbol word, and $\theta_x$ indicates a phase which is not phase-synchronized with sine or cosine entries to other multipliers 53 of other pairs. The output from each one of said sixty-two multipliers is then integrated by a corresponding one of sixty-two integrators 54, each of which, as indicated, performs the integration $$\int_0^T$$

during a period T of a complete symbol, a period which is indicated to the DFT 45 by a clock provided from the symbol synchronizer 46. The two outputs from any pair of integrators produce a complex vector $Q_k^{(n)}$, wherein n (n=1, 2, 3, . . . 31=N) indicates the symbol location in the word, and k indicates the symbol index. A vector $Q_k^{(1 \to N)}$, representing all said 31 vectors, is then conveyed into the decision device and differential decoder 48.

The decision algorithm of the decision device and differential decoder 48 is illustrated in FIGS. 8a, 8b, and 9. If the DFT output for carrier number n and symbols k−1 and k are vectors $Q_{k-1}^{(n)}$ and $Q_k^{(n)}$ respectively, and $\Delta\phi_k^{(n)}$ denotes the phase difference between $Q_k^{(n)}$ and $Q_{k-1}^{(n)}$, as shown in FIGS. 8a and 8b, the values of $\sin\Delta\phi_k^{(n)}$ and $\cos\Delta\phi_k^{(n)}$ are computed to determine a point ($\sin\Delta\phi_k^{(n)}$, $\cos\Delta\phi_k^{(n)}$) on the decision plane diagram of FIG. 9, where the decision regions are indicated.

Figure 10:
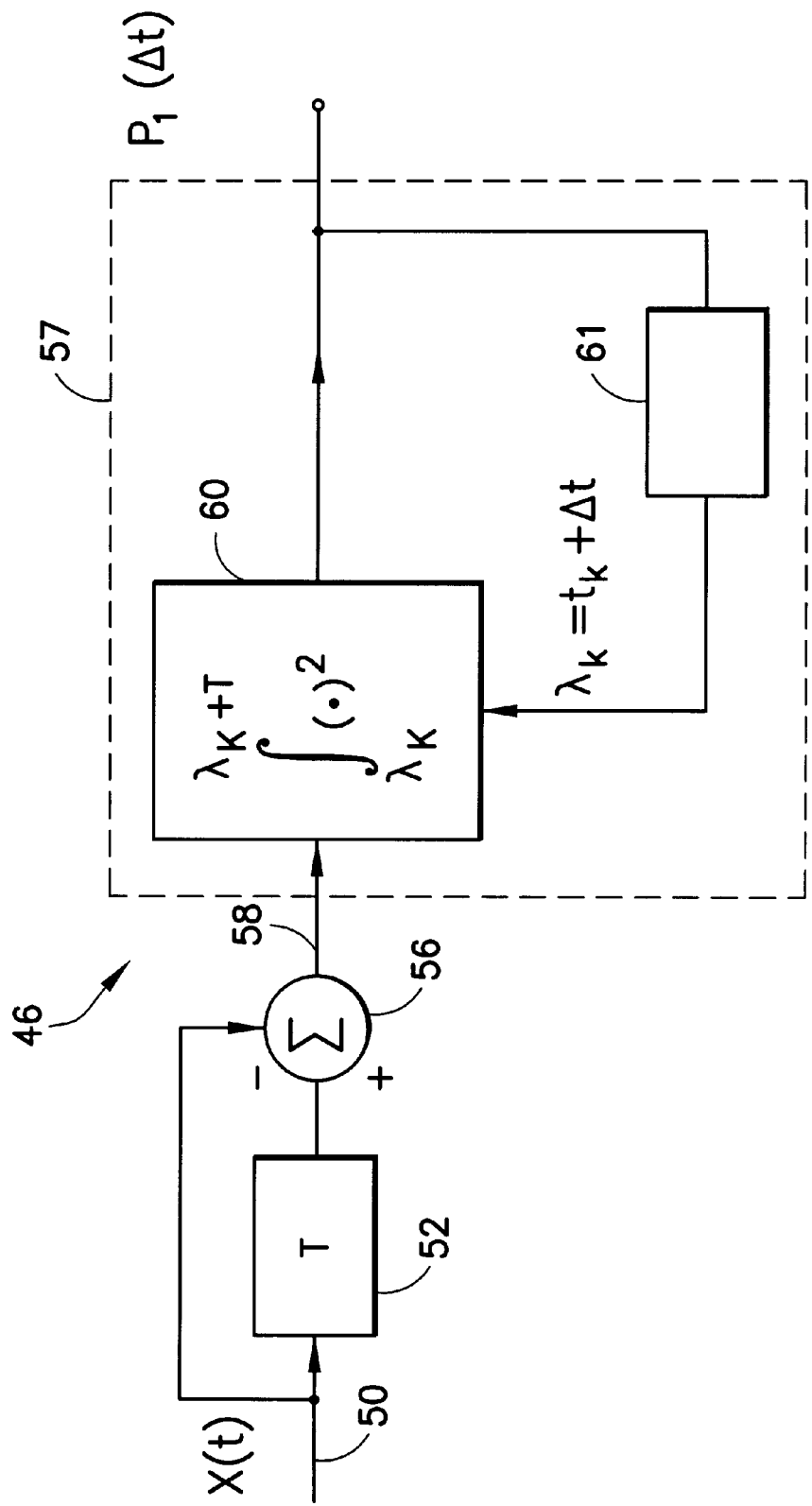
FIG. 10 illustrates in schematic form the structure of the symbol synchronizer at the receiving section of a modem according to a preferred embodiment of the invention.
Figure 11:
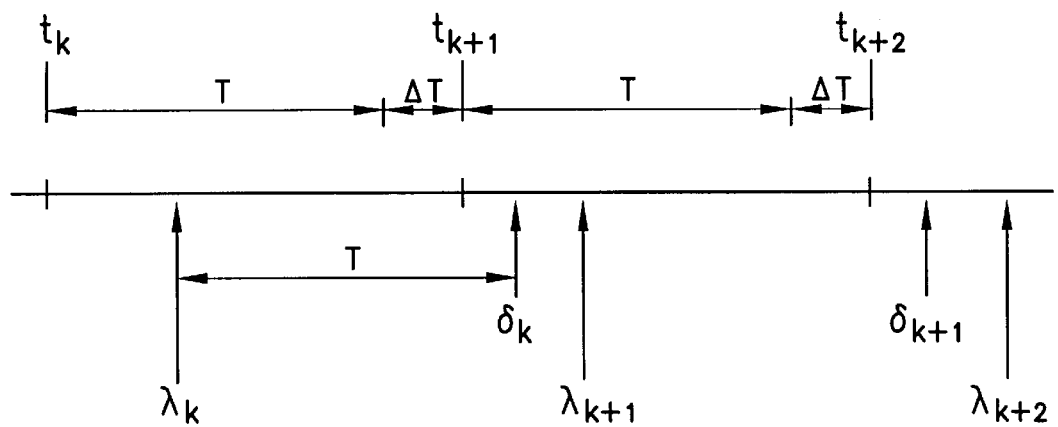
FIG. 11 is a timing diagram illustrating the operation of the symbol synchronizer of FIG. 10.

The symbol synchronizer 46 performs a symbol synchronization (often also called "timing recovery"), the purpose of which is to recover a clock at the symbol rate (or a multiple thereof) from the input to the DFT 45 at line 50, representing in digital form the input modulated signal. This clock, as hereinbefore noted, determines the boundaries of integration of the DFT 45, and is also provided to the decision device and differential decoder 48 for determining the symbol timing boundaries. FIG. 10 illustrates the structure of the symbol synchronizer 46, and FIG. 11 is a corresponding timing diagram. A received signal x(t) arriving at line 50 is inputted to the symbol synchronizer 46. Signal x(t) is in fact $S_T(t)$ corrupted by noise and distorted by the channel. It contains a modulated symbol of duration T+ΔT. The synchronizer 46 comprises a summing component 56 having two inputs, one input is provided with x(t), and a second input is provided with x(t) delayed by the delay block 52 by a period of T (T is the essential part of the symbol). The output from the summing component 56 is provided by line 58 to the average power block 57, which measures the average power of the signal provided to it, in purpose to find a timing of minimum power. Such search for minimum-power timing is carried out by varying the beginning of the integration at block 60, and providing the result of the integration into the minimum search block 61. The output of said block 61 is fed back to adjust the beginning of the integration at block 60. FIG. 11 is a timing diagram illustrating the operation of the symbol synchronizer 46. Assuming that the signal x(t) comprises a digitally modulated signal of symbols of duration T+ΔT, the beginning of the symbols occur at $t_k$, $t_{k+1}$, $t_{k+2}$, etc., and the symbols include the guarding intervals ΔT, as shown. If the processing operation of the symbol synchronizer 46 starts at a random time $\lambda_k = t_k + \Delta t$, wherein $t_k$ is the correct synchronizing time and Δt indicates the deviation from said correct synchronizing time, then, for an ideal case, with no noise or disturbances, $P_1$ is zero for 0<Δt<ΔT. For the real case, however, the symbol synchronizer 46 seeks the case in which $P_1$ is minimal. In FIG. 11, $\lambda_{k+1}$, $\lambda_{k+2}$, . . . indicate the timing of the beginning of processing of the DFT receiving Δt for synchronization, and $\delta_k$, $\delta_{k+1}$, $\delta_{k+2}$ . . . indicate the timing of the end of processing of the DSP. As is clear to those skilled in the art, after a few symbols, the value of Δt converge to such value that guarantees minimum of $P_1$.

Figure 12:
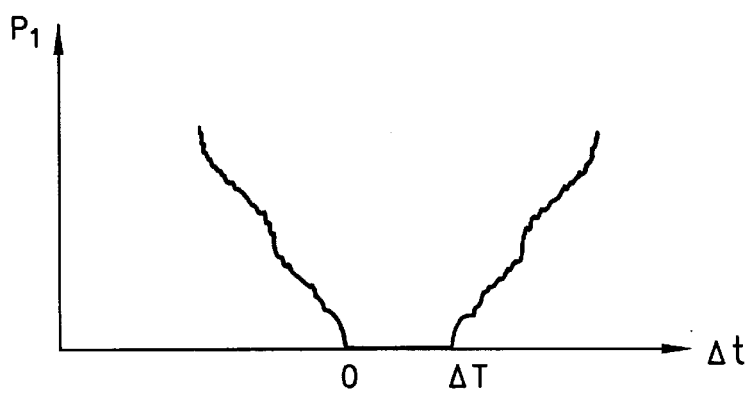
FIG. 12 graphically illustrates the operation of the average power block of the symbol synchronizer of FIG. 10.

FIG. 12 shows that a minimum power occurs during the guard periods ΔT. $P_1$ reaches its minimal power value if and only if the system is in full symbol synchronization. As said, the symbol synchronizer 46 finds the (Δt), for which the power is minimal.

The OFDM signal, when transmitted through the underwater medium, may suffer a frequency shift ΔF. A first and general reason for a frequency shift lies in the frequency accuracy of the transmitter and receiver local oscillators. For example, if the accuracy of the local oscillators is 100 ppm each, then for an RF frequency of 50 kHz, which is the frequency range used by the modem for communication, a frequency shift of $-5\ Hz \leq \Delta F \leq 5\ Hz$ may be expected. Such a frequency shift is generally constant and does not change with time, nor does it depend on the medium of signal propagation. The second reason for the carrier shift, more severe in underwater communication, results from the Doppler effect, particularly due to the movement of either the receiving or the transmitting modem, or both, or due to the change in density of the water. For example, for a relative velocity of 0.5 m/sec between the receiving or the transmitting modem, a Doppler frequency shift of about 16 Hz is expected.

As mentioned hereinbefore, two pure carriers (pilots), one below the lowest modulated carrier, and one above the highest modulated carrier, are transmitted from the transmitting modem, along with the other n modulated carriers. The frequencies of these pilots are tracked at the frequency adjust circuit 47 by two Phase Locked Loop (PLL) devices, each of which is tuned to one pilot frequency. When a shift is detected in said frequencies, an indicative frequency shift is provided to each plurality of $\sin e\omega^{(n)}$ and $\cos ine\omega^{(n)}$ components at the DFT 45. Such shift in frequency therefore realigns the bandwidth of the receiving modem for any frequency shift which may occur to the signal due to Doppler effect or due to propagation effects in the water.

As seen, the invention provides a modem which can reliably transfer data at a high rate through water. The use of OFDM modulation and a multidirectional hydrophone significantly improve the capability and quality of the data transfer, and provide a significant improvement to the efficient range of transmission. Furthermore, the modem according to the invention is provided with means for efficiently overcoming severe frequency shifts of the transmitted signal due to Doppler effects. It should be noted here that the use of OFDM is preferable for transferring data through water according to a preferred embodiment of the invention, as this modulation method enables simultaneous transmission of data over a plurality of narrow bandwidth channels, wherein each channel is minimally prone to amplitude and phase distortions due to its narrow bandwidth. However, there are other modulation methods, other than OFDM that can also be used, which also enable the simultaneous transfer of data over a plurality of narrow band channels. The use of those other modulation methods using a plurality of parallel narrow band channels for the high rate transfer of data through water is also within the scope of the invention.

The underwater modem of the invention can also be used for sound communication. In order to reliably communicate sound through water by digital techniques, a minimum bit rate of 2400 bits per second is required. As mentioned, this data rate is well within the capability of the modem of the invention.

FIG. 14 illustrates in block diagram form the structure of a sound modem according to a preferred embodiment of the invention. FIG. 15 illustrates in block diagram form the structure of the transmitting section of a sound modem according to a preferred embodiment of the invention. The sound modem, comprises in the transmitting section 2, a microphone 77 for receiving a sound, converting it to an electric signal, and conveying it into a voice encoder 144. The voice encoder 144 converts the elctrical signal representing the sound into a bit stream of data, which is in turn conveyed into the FEC encoder 5, for encoding the bit stream of data for error correction purposes as before. Then ,the encoded bit stream of data is transmitted by the transmitting section 2 in the same manner as described hereinbefore for the digital data modem. The transmitted data is received by a receiving unit 3, and detected as hereinabove described for the digital data modem. Therefore, a bit stream of data, presumably identical to the bit stream that the voice encoder 144 conveyed to the FEC encoder 5 in the transmitting section 2, is conveyed from the FEC decoder 10 of the receiving unit 3 into a voice decoder 11. The voice decoder 11 converts the bit stream into an analog sound signal, which is in turn sent to a speaker 78. Speaker 78 converts the electric sound signal to voice. Speaker 78 may be, for example, earphones of a diver, and the sound may be a voice of a diver to be communicated to another diver.

For the voice encoder 144 of the transmitting section 2 and the voice decoder of the receiving section 3, the same component known in the art as a "Vocoder" may be used. This component generally has two modes of operation: a first mode in which it operates as a voice decoder, and a second mode in which it operates as a voice encoder. For example, a vocoder of the type AC 4802AE2-C by Audiocodes can be used both in the receiving and the transmitting sections.

While some embodiments of the invention have been described by way of illustration, it will be apparent that the invention can be carried out in practice with many modifications, variations and adaptations, and with the use of numerous equivalents or alternative solutions that are within the scope of persons skilled in the art, without departing from the spirit of the invention or exceeding the scope of the claims. For example, the number of carriers, as selected above to be, for example, 31, can vary and is a function of the transfer rate and error correcting consideration. In order to achieve a higher data transfer rate, it is preferably to use a greater number of carriers. Of course, as the number of carriers increases, a more complicated FEC has to be used. According to the invention, it can be assumed that a bit rate of up to about 100 kbs is practically achievable. Furthermore, although the use of a multidirectional hydrophone is preferable, this is not a limitation, as the modem can also function with a directional hydrophone. The bandwidth, and the frequencies of the plurality of carriers, are also selective and may depend on design considerations. The use of a DSP, as well, is optional, and different alternatives may be used.

What is claimed is:

1. An underwater modulator-demodulator (modem) apparatus for transmitting and receiving data at a high rate through water, said modem comprising:
   a. A transmitting section comprising:
      data source means, comprising digital data to be transmitted through water;
      serial-to-parallel data processing means, for splitting a serial data into n parallel channels;
      n-channel modulator means, for receiving data from said n parallel channels and for modulating the same with n pairs of ultrasonic carriers, thereby producing a modulated signal; and
      hydrophone means, for receiving said modulated signal from said n channel modulator means, and for transmitting same into water;
   b. A receiving section comprising:
      hydrophone means, for receiving a modulated signal from the water, and for conveying the same into an RF circuit;
      RF circuitry, for amplifying and shaping the received modulated signal, and for converting the received modulated signal to serial digital data and for conveying the same into serial-to-parallel means;
      serial-to-parallel means, for receiving said serial digital data from the RF circuit, and for splitting the same into n parallel channels;
      n-channel demodulator means, for demodulating said serial digital data conveyed to the demodulator from said RF circuit, and for outputting n parallel channels of digital data; and
      parallel-to-serial means for receiving n parallel channels of outputted data from the demodulator means, and for converting the data into serial data; and
   c. means for compensating for the Doppler effect on a transmitted signal propagating through water comprising, in the modulator means of the transmitting section, means for transmitting two unmodulated carriers and, in the receiving section, a frequency adjusting device for measuring the frequency of at least one of said two unmodulated carriers and for comparing said measured frequency with a predetermined frequency and for adjusting the n-channel demodulator means for any deviation between said measured frequency and said predetermined frequency.

2. An underwater modulator-demodulator (modem) apparatus according to claim 1, wherein the n-channel modulator means at the transmitting section is an n-channel OFDM modulator means that receives data from the n parallel channels and modulates the data with n pairs of orthogonal ultrasonic carriers, thereby producing a modulated signal, and wherein the n-channel demodulator means at the receiving section is an n-channel OFDM demodulator means that demodulates the serial digital data conveyed to the n-channel OFDM demodulator means from the RF circuit with n pairs of orthogonal ultrasonic sines, and outputs n channels of digital data.

3. An underwater modulator-demodulator apparatus according to claim 2, wherein the transmitting section further comprises an n-channel differential encoder for receiving data from the serial-to-parallel means, for differentially encoding the data on each one of said n channels, and for providing the differentially encoded data to the n-channel OFDM modulator, and wherein the receiving section further comprises an n-channel differential decoder for receiving n channels of demodulated data from the demodulator, and for differentially decoding said n channels of demodulated data.

4. An underwater modulator-demodulator apparatus according to claim 2, wherein said frequency adjusting device compensates for Doppler effects by changing the frequency of each one of said n pairs of orthogonal sines of the OFDM demodulator by the deviation between said measured frequency and said predetermined frequency.

5. An underwater modulator-demodulator apparatus according to claim 2, wherein at least said n-channel OFDM modulator at said transmitting section and said demodulator at said receiving section comprises a DSP, incorporated within an integrated circuit.

6. An underwater modulator-demodulator apparatus according to claim 1, wherein said transmitting hydrophone and said receiving hydrophone are incorporated within a same hydrophone.

7. An underwater modulator-demodulator apparatus according to claim 1, wherein the hydrophone is multidirectional hydrophone.

8. An underwater modulator-demodulator apparatus according to claim 1, wherein the transmitting section further comprises a Forward Error Correcting (FEC) device for receiving the digital data to be transmitted, for encoding the same by at least one error correcting code, and for outputting the same to the serial-to-parallel device of the transmitting section.

9. An underwater modulator-demodulator apparatus according to claim 1, wherein the receiving section and the transmitting section are contained within the same case.

10. An underwater modulator-demodulator apparatus according to claim 1, wherein the receiving section and the transmitting section are contained in separate cases.

11. An underwater modulator-demodulator (modem) apparatus according to claim 1 for transmitting and receiving sound through water, wherein:
   in the transmitting section the data source means comprises, a microphone for receiving a sound and converting it to an analog electric signal, and a voice encoder for receiving said analog electric signal and converting the same to digital data; and
   the receiving section further comprises a voice decoder for receiving the serial data from said parallel to serial means and converting said serial data to an analog electric signal, and loudspeaker means for converting the analog electric signal into sound.

12. An underwater modulator-demodulator apparatus according to claim 11, wherein said voice encoder at said transmitting section is a vocoder operating in a voice encoding mode.

13. An underwater modulator-demodulator apparatus according to claim 11, wherein said voice decoder at said receiving section is a vocoder operating in a voice decoding mode.

14. An underwater modulator-demodulator apparatus according to claim 11, wherein said sound is a voice of a diver.

15. An underwater modulator-demodulator apparatus according to claim 14, wherein said loudspeaker means are earphones of a diver.

16. A method for carrying out a high data rate underwater communication, comprising the following steps:
(i) In a transmitting section, transmitting data by:
  a. Providing a serial data in digital form to be transmitted;
  b. Providing means for splitting the serial data into n parallel channels, and assigning symbols to groups of data bits;
  c. Modulating said symbols by an n-channels OFDM modulator;
  d. Providing two unmodulated carriers as part of said OFDM modulated data; and
  e. Transmitting said OFDM modulated data, including said two unmodulated carriers, through a hydrophone, into the water; and
(ii) In a receiving section, receiving said transmitted OFDM modulated data by:
  a. Receiving said transmitted OFDM modulated data, including said two unmodulated carriers, by a hydrophone;
  b. Measuring the frequency of at least one of said two unmodulated carriers;
  c. Comparing said measured frequency of said at least one of said two unmodulated carriers with a predetermined frequency;
  d. Adjusting an n-channels OFDM demodulator for any deviation between said measured frequency and said predetermined frequency;
  e. Demodulating the received signal by said n-channel OFDM demodulator;
  f. Decoding the demodulated data into n channels; and
  g. Converting the data from said n channels from parallel into serial form.

17. A method for carrying out a high data rate underwater communication according to claim 16, wherein said receiving and said transmitting are performed within a same casing.

18. A method for carrying out a high data rate underwater communication according to claim 17, wherein said receiving hydrophone and said transmitting hydrophone are incorporated within a same hydrophone.

19. A method for carrying out a high-rate underwater communication according to claim 16, wherein said receiving hydrophone and said transmitting hydrophone are multidirectional hydrophones.

20. A method for carrying out a high-rate underwater communication according to claim 16, wherein the time duration of each symbol includes a guard time.

21. A method for carrying out a high-rate underwater communication according to claim 20, wherein said guard time is used for symbol synchronization at said receiving end.

22. A method for carrying out a high-rate underwater communication according to claim 16, wherein said serial data provided for transmission is an electric signal representing sound, which is converted to serial data by a voice encoder, and said outcome serial data is converted into an electric signal representing sound.

23. An underwater communication apparatus for transmitting and receiving data comprising:
a transmitter comprising:
  a digital data source;
  a serial-to-parallel converter for receiving serial digital data from said digital data source and for converting said received serial digital data to more than two parallel data channels;
  a multi-channel modulator for receiving more than two parallel data channels from said serial-to-parallel converter and for modulating each of said more than two parallel data channels with an ultrasonic carrier to produce a modulated signal; and
  a transmitting hydrophone for receiving said modulated signal and for transmitting said modulated signal in water;
a receiver comprising:
  a receiving hydrophone for receiving a modulated signal;
  a RF circuit connected to said hydrophone for receiving therefrom said received modulated signal, said RF circuit amplifying and shaping said received modulated signal and converting said received modulated signal to serial data;
  a serial-to-parallel converter for receiving said serial data from said RF circuit and for converting said serial data to more than two parallel data channels;
  a multi-channel demodulator for receiving from said serial-to-parallel converter said more than two parallel data channels and for demodulating each of said more than two parallel data channels and for outputting more than two parallel data channels; and
  a parallel-to-serial converter for receiving from said multi-channel demodulator said more than two parallel data channels and for converting said more than two parallel data channels into serial data; and
Doppler effect compensator comprising, in the multi-channel modulator, a transmitter for transmitting two unmodulated carriers and, in the receiver, a frequency adjusting device for measuring the frequency of at least one of said two unmodulated carriers and for comparing said measured frequency with a predetermined frequency and for adjusting said multi-channel demodulator for any deviation between said measured frequency and said predetermined frequency.

24. An underwater communication apparatus according to claim 23, wherein said multi-channel modulator is an n-channel OFDM modulator that receives more than two parallel data channels from said serial-to-parallel converter and modulates said received data with n pairs of orthogonal ultrasonic carriers, thereby producing a modulated signal, and wherein said multi-channel demodulator is an n-channel OFDM demodulator that receives more than two parallel data channels from said serial-to-parallel converter and demodulates said received data with n pairs of orthogonal ultrasonic sines, and outputs n parallel data channels.

25. An underwater communication apparatus according to claim 24, wherein said Doppler effect compensator compensates for Doppler effects by changing the frequency of each one of said n pairs of orthogonal sines of said OFDM demodulator by the deviation between said measured frequency and said predetermined frequency.

26. An underwater communication apparatus according to claim 23, wherein said transmitter and said receiver are contained within the same case.

27. An underwater communication apparatus according to claim 23, wherein said transmitter and said receiver are contained within separate cases.

28. An underwater communication apparatus according to claim 23, wherein a single hydrophone comprises said transmitting hydrophone and said receiving hydrophone.

29. An underwater communication apparatus according to claim 23, wherein said transmitting hydrophone and said receiving hydrophone each comprise a multidirectional hydrophone.

30. An underwater communication apparatus according to claim 23, wherein said transmitter further comprises a multi-channel differential encoder for receiving data on said more than two parallel data channels from said serial-to-parallel converter and for differentially encoding said data on each one of said more than two parallel data channels, and for providing the differentially encoded data to said multi-channel modulator, and wherein said receiver further comprises a multi-channel differential decoder for receiving more than two parallel data channels from said multi-channel demodulator, and for differentially decoding said more than two parallel data channels.

31. An underwater communication apparatus according to claim 23, wherein said transmitter further comprises a Forward Error Correcting (FEC) device for receiving digital data from said digital data source and for encoding said digital data by at least one error correcting code, said Forward Error Correcting (FEC) device outputting said encoded digital data to said serial-to-parallel converter.

* * * * *